J. J. WOHLGEMUTH AND F. LILLY.
APPARATUS FOR MAKING INNER TIRES.
APPLICATION FILED AUG. 17, 1918.
1,329,872.
Patented Feb. 3, 1920.
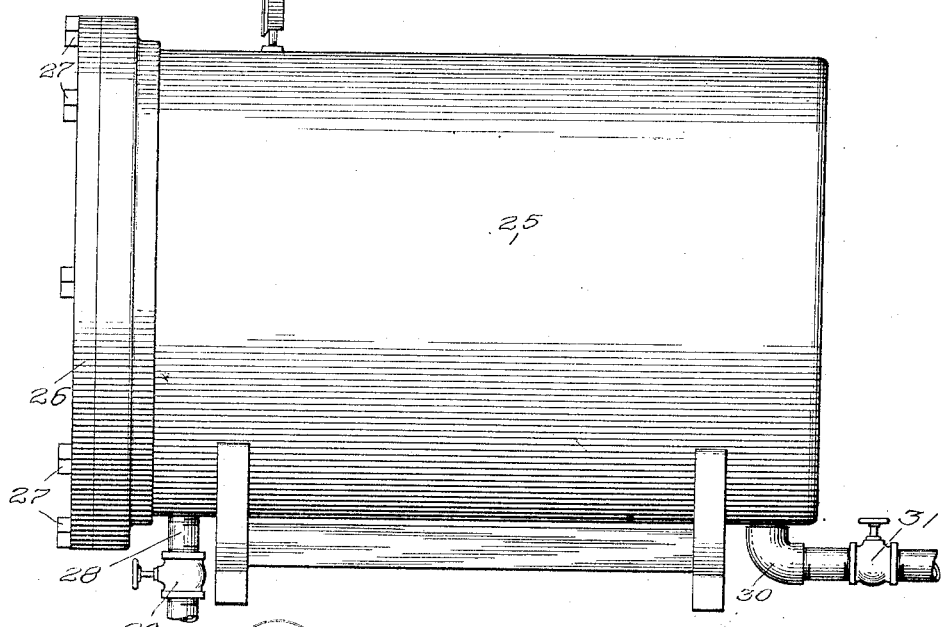
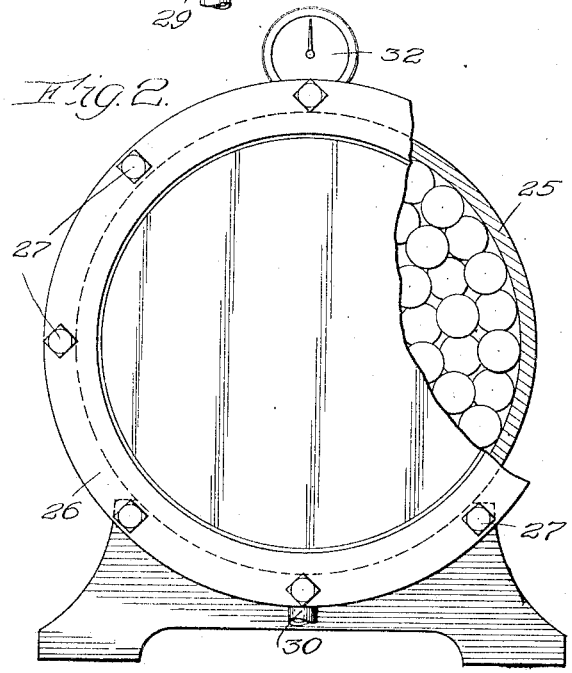
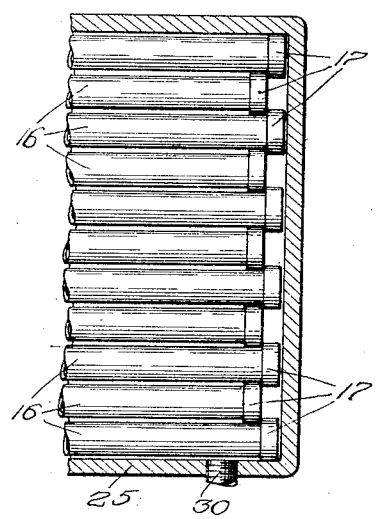

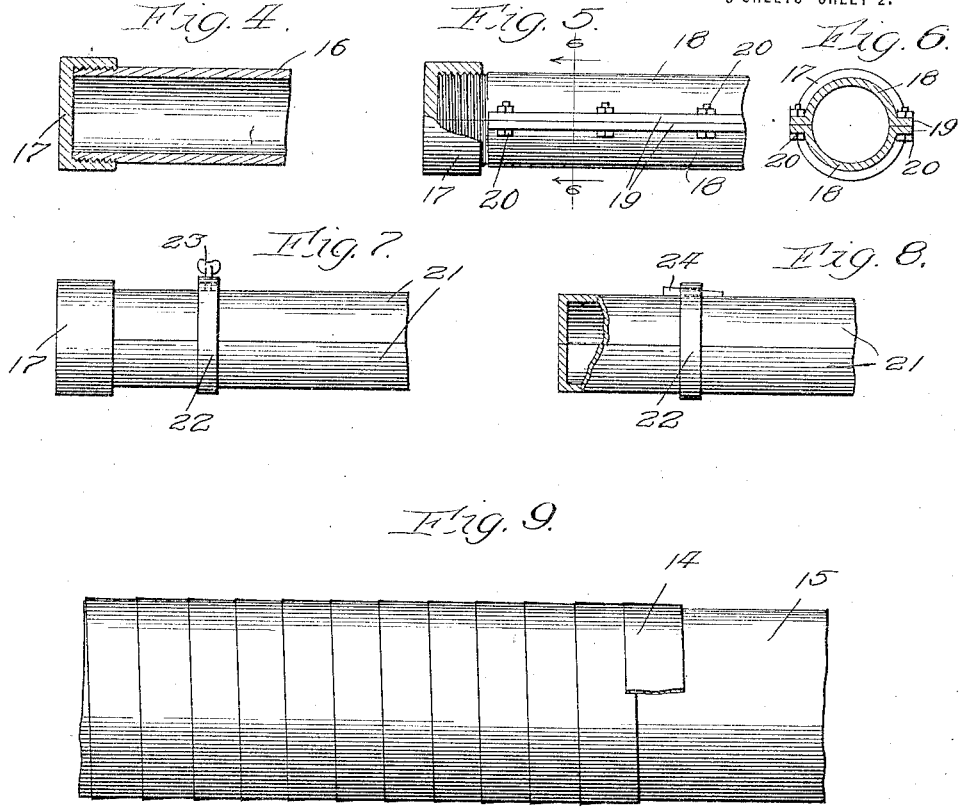
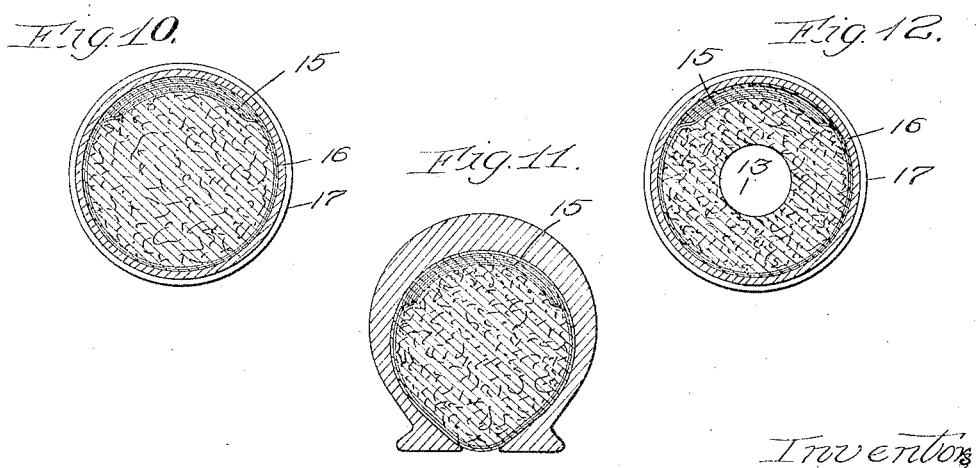

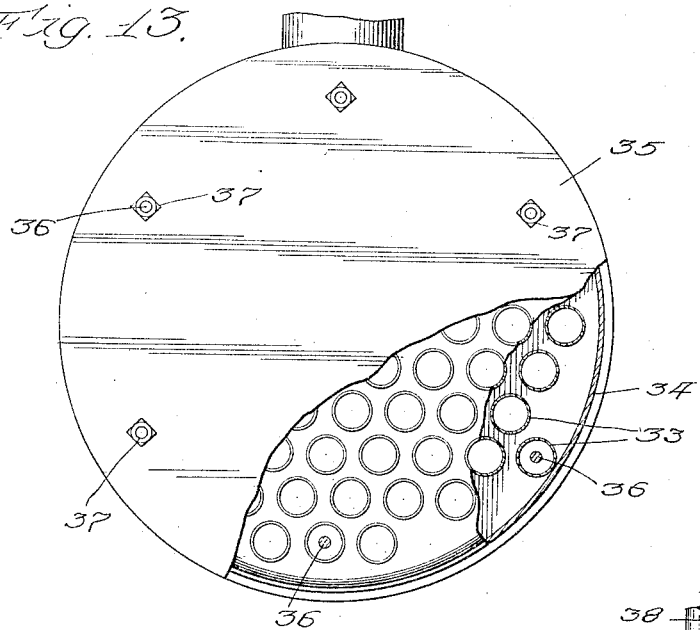
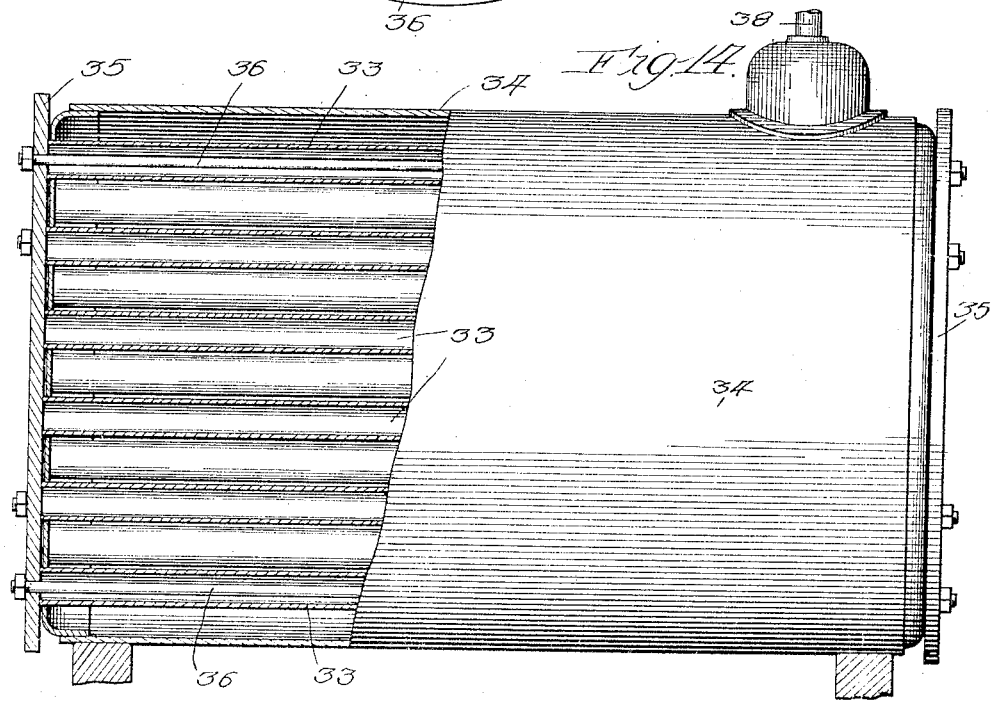

UNITED STATES PATENT OFFICE.

JACOB J. WOHLGEMUTH AND FORD LILLY, OF CHICAGO, ILLINOIS.

APPARATUS FOR MAKING INNER TIRES.

1,329,872.   Specification of Letters Patent.   Patented Feb. 3, 1920.

Application filed August 17, 1918. Serial No. 250,329.

*To all whom it may concern:*

Be it known that we, JACOB J. WOHLGEMUTH and FORD LILLY, citizens of the United States, and residents of the city of Chicago, in the county of Cook and State of Illinois, have invented certain new and useful Improvements in Apparatus for Making Inner Tires, of which the following is a specification.

Our invention relates to apparatus for making resilient inner tires for vehicle wheels.

An object is the provision of making such inner tire in cylindrical form so that it can be cut into lengths to fit either new or used casings and have the required pressures thereon.

A further object is the provision of an inner tire which may be placed in tire casings without the use of complicated tools and which may be placed in such outer casings by users of such casings.

A still further object is the provision of molds for forming such inner tires in cylindrical form.

Other objects will appear hereinafter.

An embodiment of our invention is shown in the accompanying drawings forming a part of the specification, and in which, Figure 1 is a side elevation of an open steam vulcanizer suitable for use in vulcanizing inner tires embodying our invention.

Fig. 2 is a front view of the same with a portion of the covering broken away to show the interior.

Fig. 3 is a fragmental longitudinal section showing molds in the vulcanizer already mentioned.

Fig. 4 is a fragmental longitudinal section of a mold embodying our invention.

Fig. 5 is a side view of a modified form of mold.

Fig. 6 is a section taken on line 6—6 of Fig. 5.

Fig. 7 is a side elevation of another form of mold.

Fig. 8 is a similar view of a still different form of mold.

Fig. 9 is a fragmental elevation of a completed inner tire embodying our invention.

Fig. 10 is a cross section taken through a tire in a mold embodying our invention.

Fig. 11 is a cross section of a tire placed in an outer casing.

Fig. 12 is a view similar to Fig. 10 except showing a slight modification of the inner tire.

Fig. 13 is an end view of a conventional steam boiler adapted for use in vulcanizing our inner tire, and Fig. 14 is a side elevation of the same with a portion broken away to expose underlying parts.

Our inner tire may be formed of any suitable substance, but we prefer to use a rubber compound or composition in which there are gas-making substances which, during vulcanization, will produce gas in the composition in order to make the inner tire spongy when vulcanized. Our inner tire gives a very resilient action in use, due to the resiliency of the rubber and also to the inclosed gases in the tire. It has the effect of increasing the life of the outer casing on account of always having the required pressure on the outer casing in use. It is practically free from punctures since if some of the inclosed cells are punctured, the others will remain intact and maintain the resiliency of the tire.

It will be found that there are many compounds well known in the art of rubber compounding which will produce our desired tire. We have found that one of the many compounds may consist of the following:

6 parts fine para rubber,
6 parts caoutchouc ball,
12 parts zinc oxid,
2 parts sulfur,
1 part ammonia water (such as used for domestic purposes),
6 parts sodium bicarbonate,
8 parts ground cork.

It will be found in practice that any compound used for making our inner tire will have to be varied as to proportions for the different sizes of tires, so as to give proper resiliency to any desired size of tire. Any rubber worker will know how these compounds may be varied to obtain the desired results.

The ingredients used in making our inner tire may be mixed on a conventional mill, or in any other desired manner. After the ingredients are properly mixed, they are run through a tubing or other machine for forming the material into an elongated cylinder. The diameter of the cylinder corresponds to the size of the casing it is desired to fill. For instance, a larger diameter of cylindrical rubber compound will be required to fill a casing of larger size than a casing of smaller size. It will be apparent that the rubber compound coming from the tubing machine, or the like, may be run out solid as indicated in Fig. 10, or that an opening, such as indicated at 13 in Fig. 12, may be formed.

After the material has been run out through the tubing machine or the like, a fabric covering is put on the rubber compound. This may be any desired form of fabric covering. We have found in use that a narrow ribbon or strip of fabric 14 may be wound spirally around the rubber compound, as indicated in Fig. 9, which serves the purpose admirably. The inner tire may be made up of the sponge rubber compound and its fabric covering, or a fabric strip 15, as clearly indicated in Figs. 10, 11 and 12, may be placed longitudinally of the rubber compound to form a tread strip, or strip adapted to increase the life of the inner tire. Also, should the outer casing in which the inner tire is being used, become worn through, the tread strip 15 would form a temporary tread for a wheel or until the inner tire could be placed in a new casing.

In vulcanizing our inner tire, we place the rubber compound with its covering thereon in a suitable mold having a substantially cylindrical bore of the required size for the size of inner tire being made. We preferably form the bore of the mold slightly larger than the rubber compound so that the latter may be placed into the mold easily and also be able to expand during vulcanization for the production of the gas cells. A simple mold for this purpose may be a pipe 16, a fragment of which is shown in Fig. 4. The ends of pipe 16 may be closed in any desirable manner. We have shown a cap 17 threaded on one end thereof, as illustrating one way of closing the ends of pipe 16. Another form of mold is shown in Fig. 5 in which the pipe is made up of two parts 18 having flanges 19 along their adjacent edges and the flanges 19 secured together in any desirable manner such as by bolts 20 passing therethrough. The ends of the mold 18—18 are also closed in any desirable manner. We have shown a cap 17 threaded thereon similar to the cap on the pipe 16, but any other desirable means may be used to close the ends of the mold, such as for instance, the means of closing the ends shown in Fig. 8. In Fig. 7 we have shown the mold made up of two parts 21, semi-cylindrical in form having a tubular bore therein. There are no flanges shown on the parts 21, but these parts are held together by a plurality of rings 22, one of which is shown. The rings are preferably slightly larger than the mold 21—21, so that they may be slipped on easily and then locked tightly against the members 21—21 so as to hold such members against relative movements. We have shown a set screw 23 in Fig. 7 as a means for locking the rings to the members 21. In Fig. 8, we have shown a wedge 24 inserted between the ring 22 and the members 21 to hold the latter against relative movements. In any form of mold the ends may be closed in any of the manners indicated, or as desired.

After the rubber compound has been prepared, as above, and placed in the molds, said molds are piled up in a gas-tight casing 25. Figs. 2 and 3 show how these molds may be placed in the casing 25. The casing 25 preferably has one end 26 removable so that the molds can be easily placed into and taken out of the casing. The lid 26 may be secured to the casing 25 by bolts 27 or in any other desirable manner. The casing 25 is provided with an inlet pipe 28 for the introduction of steam. The pipe 28 is preferably provided with a valve 29 for controlling the admission of steam to the interior of casing 25. An outlet pipe 30 is also provided in the casing 25 for draining off air, condensed steam or water from the interior of casing 25. A valve 31 may be provided to control the passage of air, condensed steam and the like from pipe 30. A gage 32 may be provided on the casing 25 for ascertaining the pressure of the steam in the container 25.

In vulcanizing the compound above referred to, it requires about one hour's time and a steam pressure of forty-five to fifty pounds per square inch. It will be apparent that the time for vulcanizing and the pressures used will vary according to the sizes of the inner tires vulcanized, and also the materials used in the inner tires. The steam during vulcanization comes in contact with the molds and the latter are preferably made tight enough to prevent the steam, in any appreciable quantities, getting into contact with the rubber compound above mentioned, but it will be apparent that in vulcanizing other compounds, it may be desirable to have the steam come into contact with the rubber compound during vulcanization.

In Figs. 13 and 14, we have shown how our inner tire may be vulcanized in a conventional steam boiler such as used in making steam. It will be apparent from Figs. 13 and 14, that any form of steam boiler employing tubes may be used. This would include, of course, such boilers as are mounted in masonry and locomotive steam boilers. When using a steam boiler for a vulcanizer, the cylindrical rubber compound is placed in the tubes 33 of the steam boiler 34. The boiler should be selected which has tubes of proper sizes for the inner tires it is desired to vulcanize. That is, the tubes 33 should have bores of substantially the same size as though a mold 16 were used. When the sponge rubber material is placed in the tubes of the boiler, the ends may be closed in any desirable manner, such as placing the members 35 on the ends of the boiler and running bolts 36 through certain of the tubes which are left empty to hold the members 35 in place. As many bolts 36 may be used as desired. This is merely suggesting one means of closing the ends of the tubes 33 and any other desirable means may be employed.

When the inner tire material has been vulcanized, it expands to fill the molds, whether it be the tubular molds 16, 18 or 21 or the tubes 33. The vulcanized material may be forced out of such molds in any desirable manner. We have found that forcing compressed air against the ends of the material after the closures for the ends of the molds have been removed, provides an efficient way of taking the vulcanized material out of the molds. We have also found that plungers may be used to force the vulcanized material out of the molds.

In placing the vulcanized inner tires in outer casings, the material is cut off into lengths sufficient to fill such outer casings and produce the desired pressure on said casings which correspond to the usual air pressures used in pneumatic tires in such casings. In use, it will be found that casings which have been used are somewhat stretched or enlarged and require longer lengths of the material. Since the material is yielding, it can be squeezed into the casing so as to make it slightly larger in diameter thereby completely filling any desired casing by using the proper lengths of the material. That is to say, if a used casing is filled, a slightly longer piece of material is required than where a new casing, which has not been stretched, is to be filled.

When vulcanizing inner tires in a steam boiler, such as indicated in Figs. 13 and 14, steam is fed into the boiler through a pipe 38 from some source for supplying the steam, as for instance, from another steam boiler, not shown.

We claim:

1. An inner tire mold comprising a tubular member divided longitudinally and having a substantially cylindrical bore therein, and a cap threaded on inclosing the ends of said tubular member, said caps also holding the end portions of the tubular member together.

2. An inner tire mold comprising a tubular member divided longitudinally and having a substantially cylindrical bore therein, a cap threaded on each end of said tubular member, a ring encircling an intermediate portion of the tubular member, and means between the ring and tubular member holding the parts of the latter together.

3. An inner tire mold comprising a tubular member divided longitudinally and having a substantially cylindrical bore therein, a cap threaded on and inclosing the ends of said tubular member, said caps holding the end portions of the tubular member together, a ring encircling an intermediate portion of the tubular member, and a set screw threaded in said ring and engaging one of said parts for clamping the intermediate parts of the tubular member together.

4. An inner tire mold comprising a tubular member divided longitudinally, a cap threaded on each end of said tubular member, said caps being of a greater diameter than any part of the tubular member and adapted to space the latter from other objects, a ring encircling said member intermediate its ends, a set screw extending through said ring and engaging one of said parts for holding the intermediate portions of the tubular member together.

5. An inner tire mold comprising a member made up of two semi-cylindrical hollow parts, rings encircling said member, and a set screw mounted in each of said rings and adapted to engage one of the parts of said member for holding said parts against relative movements.

In testimony whereof we have signed our names to this specification on this 13th day of August, A. D., 1918.

JACOB J. WOHLGEMUTH.
FORD LILLY.